Oct. 13, 1970  G. H. FATHAUER  3,534,355
LOAD WARNING DEVICE
Filed March 28, 1967  6 Sheets-Sheet 1

INVENTOR.
GEORGE H. FATHAUER
ATTORNEYS

INVENTOR.
GEORGE H. FATHAUER

Oct. 13, 1970        G. H. FATHAUER        3,534,355

LOAD WARNING DEVICE

Filed March 28, 1967                                          6 Sheets-Sheet 5

INVENTOR.
GEORGE H. FATHAUER

BY *Hill, Sherman, Meroni, Gross & Simpson* ATTORNEYS

United States Patent Office 3,534,355
Patented Oct. 13, 1970

3,534,355
LOAD WARNING DEVICE
George H. Fathauer, Decatur, Ill., assignor to The Dole Valve Company, Morton Grove, Ill., a corporation of Illinois
Filed Mar. 28, 1967, Ser. No. 626,563
Int. Cl. B66c *13/16;* G06g *7/12;* G08b *21/00*
U.S. Cl. 340—267
14 Claims

ABSTRACT OF THE DISCLOSURE

A load warning device for a crane having a load cell for sensing the weight of the load being lifted by the crane and an angle transducer mounted on the boom of the crane. A function generator is responsive to the outputs of the load cell and the angle transducer and computes the product of such outputs by utilizing a multi-point tapped potentiometer positioned by a pendulum in the angle transducer and set by operational amplifiers.

FIELD OF THE INVENTION

This invention relates generally to a load warning device for a crane and the like and more particularly to a warning device which senses both load on the crane and the angle of the boom and provides an alarm when a predetermined relationship of one function exists with respect to the other function.

BACKGROUND OF THE INVENTION

The safe load capabilities of a crane are dependent upon the strength of the load carrying structures and upon the point at which the crane can be tipped. It is readily obvious that the load carrying structures of a crane, such as the hoisting cable, can support a predetermined safe load, beyond which point the possibility of breakage or damage to the structures can result. In addition, however, and of greater importance, are those conditions which may produce a tipping moment and overturn the crane. Tipping of the crane is dependent upon the weight of the load being lifted and the angle of the boom with respect to a horizontal line.

It has been the practice in the past to employ a chart for determining the safe load capabilities of a crane with respect to the angle of the boom. An operator of the crane, therefore, must be able to judge the weight of the load which is to be lifted by the crane and must also be able to judge the angle of the boom with respect to a horizontal line. By comparing the weight of the load to be lifted by the crane and the angle of the boom on the chart, the operator can determine if the load exceeds a safe limit. Since the operator's judgment is required to determine the weight of the load and the angle of the boom, a relatively great probability of error exists.

One method employed for determining the angle of the crane boom is that of measuring horizontally from the pivot point of the boom to the load and either computing mathematically or consulting a graph to find the angle of the boom with respect to a horizontal line. When the angle of the crane boom is determined and the weight of the load is either known or estimated, the operator of the crane must then consult a graph to determine the safe loading conditions for the crane which will not result in a tipping of the crane.

A need exists, therefore, for apparatus which can sense the weight of the load being lifted by the crane and the angle of the crane boom and for computing the product of these two functions to provide a readout of the same which will indicate the loading condition of the crane. Such an apparatus would completely eliminate the human error which presently exists in the determination of the safe load limit for a crane. That is, since it is necessary for an operator to judge the weight of the load to be lifted by the crane and also the angle of the boom with respect to a horizontal line before consulting the chart to determine if the two functions fall within a safe load range, the probability of error resulting from the operator's judgment is relatively great. In addition, the operator is subject to making an error when reading the chart, further increasing the probability of an error existing.

SUMMARY OF THE INVENTION

Accordingly, the present invention generally includes means for sensing the weight of the load being lifted by the crane and providing an output indicative thereof, means for sensing the angle of the crane boom and providing an output indicative thereof, and means for computing the product of the two outputs and providing a readout indicative of the load capabilities of the crane.

It is an object of the present invention to provide a load warning device for a crane or the like which automatically senses the weight of the load being lifted by the crane and the angle of the crane boom and computes the product of these two functions to provide a readout indicative of the load carrying capabilities of the crane.

A feature of the present invention resides in the provision of means for modifying the computation factors to correct for certain load limitations in the crane structure as well as for safety factors.

Another feature of the present invention resides in the provision of a plug-in program selector which enables the crane operator to easily select computation factors corresponding to the operating conditions of the crane.

Still another important feature of the present invention resides in the provision of a readout calibrated to read the percent of crane capacity so as to assure safe operation of the crane at all times.

Another important feature of the present invention resides in the provision of a readout for indicating the weight of the load as well as a readout for indicating the angle of the crane boom in degrees of operating radius.

Another feature of the present invention resides in the provision of a selector switch and a computing circuit for setting the parts of line in the reeving system of the crane and automatically programming the percent capacity readout accordingly.

Still another important feature of the present invention resides in the provision of an automatic alarm system which energizes an external alarm device when a predetermined percentage of capacity point is reached.

These and other objects, features and advantages of the present invention will be more fully realized and understood from the following detailed description when taken in conjunction with the accompanying drawings, wherein:

BRIEF DESCRIPTION OF THE DRAWINGS

Like reference numerals throughout the various views of the drawings are intended to designate the same or similar structures.

DESCRIPTION OF THE PREFERRED EMBODIMENT

Figure 1:
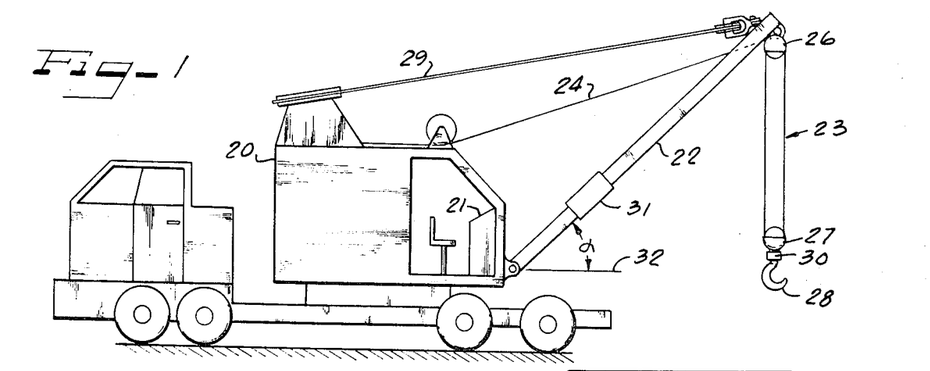
FIG. 1 is a side elevational view of a crane employing the apparatus of the present invention.

FIG. 1 illustrates a typical crane which is provided with the apparatus of the present invention to provide a readout of the safe load carrying capabilities thereof. The crane includes a cab, generally designated with the reference numeral 20, which houses the drive units (not shown) for lifting and moving a load and a control console 21. A boom 22 is pivotally mounted at one end thereof to the cab 20 and supports a tackle assembly 23 at the other end thereof. A cable 24 which is connected to a take-up reel (not shown) within the cab 20 extends to and forms a part of the tackle assembly 23.

The tackle assembly 23 is formed of a pair of pulleys 26 and 27 and a hook 28. The pulley 26 is secured to one end of the boom 22 and the hook 28 is connected to the pulley 27. The cable 24 extends over the pulleys 26 and 27 to form the tackle assembly 23. The angle $\alpha$ of the boom 22 with respect to a horizontal line is controlled by means of a cable 29 secured to the upper end of the boom 22 and connected to another take-up reel (not shown) within the cab 20.

The weight of the load which is to be supported on the hook 28 is sensed by a load cell 30. An angle transducer 31 is mounted on the boom 22 and senses the angle of the boom 22 with respect to a horizontal line 32. The outputs of the load cell 30 and the angle transducer 31 are supplied to apparatus in the control console 21 within the cab 20 wherein a computation is made therefrom.

Figure 2:
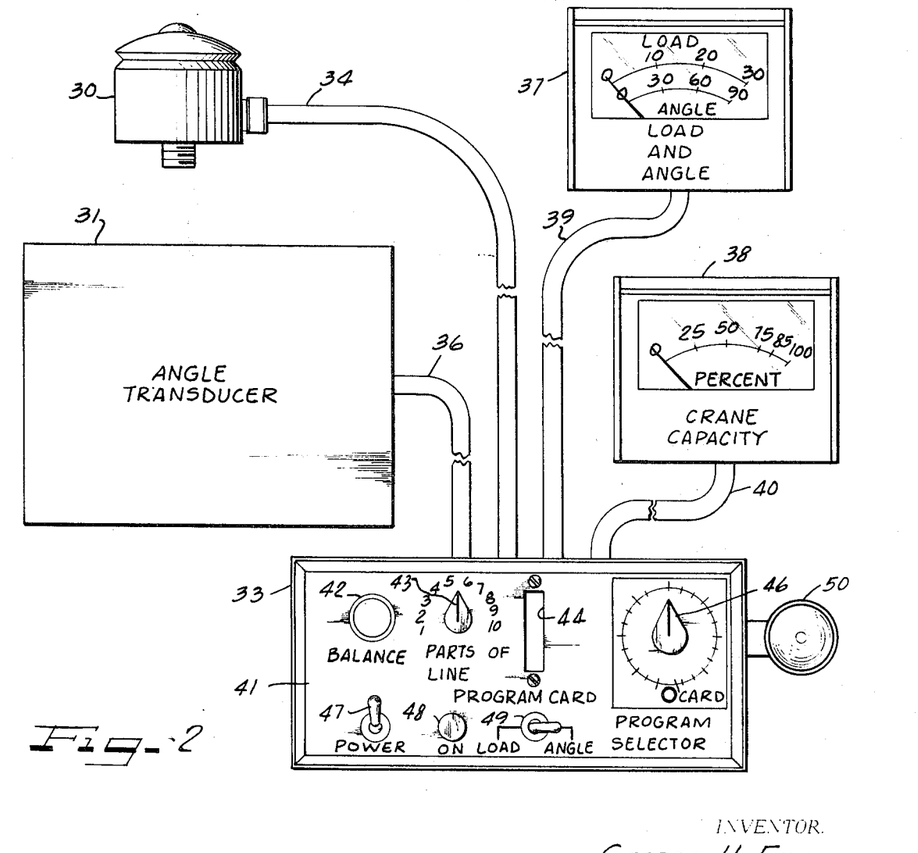
FIG. 2 is a view in elevation of the components in assembled form of the present invention.

FIG. 2 illustrates the components forming the load warning device of the present invention which are adapted for being mounted on the appropriate crane structures. In particular, the load cell 30 is mounted at a point in the load supporting structures so as to sense the weight of the load and the angle transducer 31 is mounted on the boom 22 to sense the angle thereof with respect to a horizontal line. Outputs of the load cell 30 and the angle transducer 31 are supplied to a control unit 33 which contains all of the electronics for performing the desired computations. The load cell 30 is connected to the control unit by means of a cable 34 and the angle transducer 31 is connected to the control unit 33 by means of a cable 36. The cables 34 and 36 are formed of the necessary electrical wires for connecting the load cell 30 and the angle transducer 31 to the control unit 33.

A meter 37 provides a readout of the load being supported on the hook 28 and the angle $\alpha$ of the boom 22 with respect to the horizontal line 32. A meter 38 provides a readout of the crane capacity in percent. The meter 37 is connected to the control unit 33 by means of an electrical cable 39 and the meter 38 is connected to the control unit 33 by means of an electrical cable 40. The electrical cables 39 and 40 are also formed of the wires necessary for interconnecting the respective meters 37, 38 with the control unit 33.

The control unit 33 is provided with a front panel 41 having a plurality of controls mounted thereon. In particular, a control knob 42 controls the balance of the load cell 30 output. That is, when there is no load being supported on the hook 28, the meter 37 should indicate a zero load. A control knob 43 changes a computation factor in accordance with the number of lines or "parts of line" of the tackle assembly 23. A slot 44 is provided in the front panel 41 of the control unit 33 and is disposed for receiving a program card therein. A control knob 46 is provided for changing from one program to another program incorporated in the electronics of the control unit 33. A switch 47 connects power to the electronics within the control unit 33 and a lamp 48 indicates when such power is being applied. A switch 49 is provided for selecting the desired readout on the meter 37. That is, when the switch is in the position illustrated in the drawing, the meter 37 will provide a readout of the angle $\alpha$ of the boom 22 with respect to the horizontal line 32. However, when the switch 49 is in the opposite position to that illustrated, the meter 37 will provide a readout of the load being supported on the hook 28. A lamp 50 is mounted on the control unit 33 and is actuated when a critical loading point is reached. Each of the control functions provided by the individual controls on the unit 33 will be explained in greater detail in the description of the electronics hereinbelow.

Figure 3:
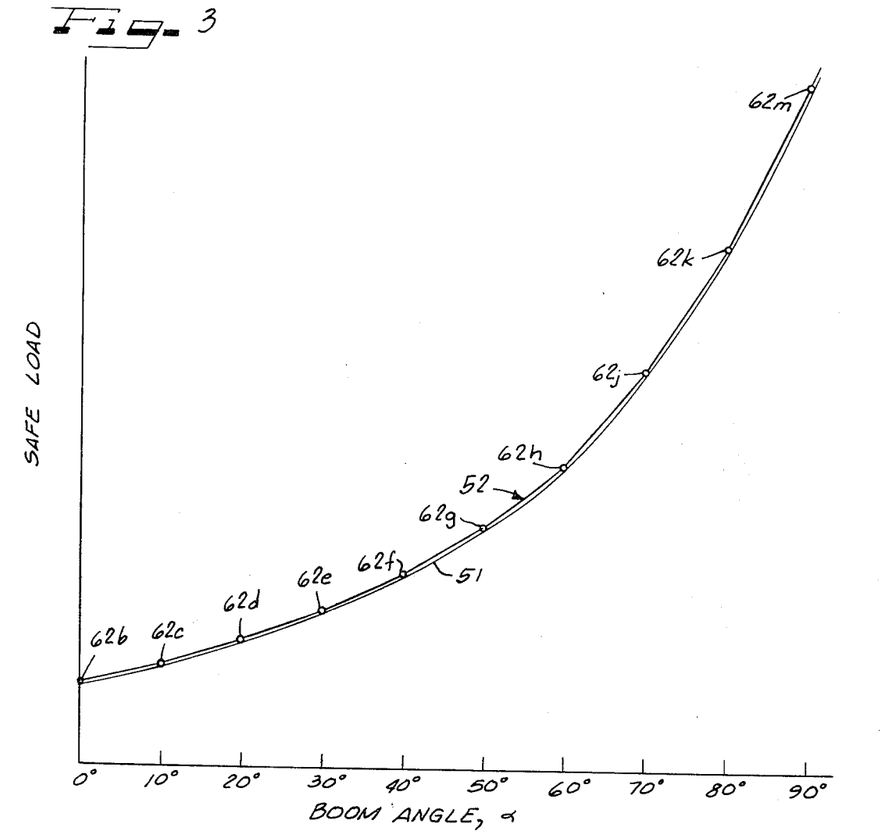
FIG. 3 is a graph of typical loading capabilities of a crane.

FIG. 3 illustrates a graph of boom angle with respect to the load. In the past, when an operator of a crane desired to lift a particular load, it was necessary to consult a chart such as that illustrated in FIG. 3 to determine if the crane could support the particular load at a specified angle of the boom with respect to a horizontal line. By finding the angle of the boom with respect to a horizontal line on the axis of abscissas, the operator could find the weight of the load which the crane could safely support without tipping. The continuous curve illustrated in FIG. 3 and designated with the reference numeral 51 is a typical curve employed for determining the safe load to be supported by a crane at a particular angle of the boom with respect to a horizontal line.

The device of the present invention simulates the curve 51 by developing a plurality of voltages which develop fixed voltage drops across a resistive element. These voltage differentials are represented in FIG. 3 by the straight line sections of a curve 52. By sensing the voltage developed across the resistive element at a point corresponding to the angle of the boom 22 with respect to the horizontal line 32, the loading conditions can be accurately determined.

Figure 4:
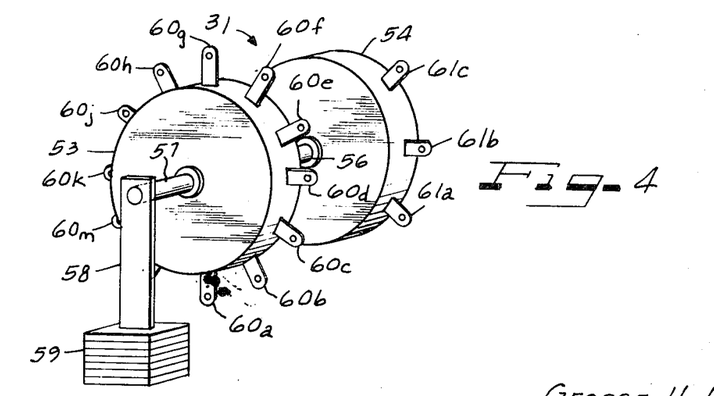
FIG. 4 is a diagrammatic illustration of an angle transducer which forms a part of the present invention.

FIG. 4 illustrates one configuration of the angle transducer 31 mounted on the boom 22. The structure illustrated in FIG. 4 includes a pair of potentiometers 53 and 54 which are connected together by means of a shaft 56. The potentiometers 53 and 54 are illustrated schematically in FIG. 6. The housings of the potentiometers 53 and 54 are mounted by suitable means (not shown) on the boom 22 of the crane. The shaft 56 is secured to the movable contact arm of the potentiometers 53 and 54 to rotate the same with respect to the housings thereof. A portion 57 of the shaft 56 extends from one side of the potentiometer 53 and is secured to one end of a lever 58 which supports a mass 59 at the other end thereof. Since the housings of the potentiometers 53 and 54 are mounted by suitable means on the boom 22 of the crane, angular movement of the boom 22 will cause a displacement of the movable contact arm of each of the potentiometers 53 and 54 by virtue of the lever arm 58 being maintained in a vertical position.

The potentiometer 53 includes a plurality of terminals 60a–60m and the potentiometer 54 includes a plurality of terminals 61a–61c. The terminal 60a, for example, is electrically connected to the movable contact arm of the potentiometer 53 and the terminal 61a, for example, is connected electrically to the movable contact arm of the potentiometer 54. The remaining terminals 60b–60m are electrically connected to taps on the resistance element of the potentiometer 53 and the remaining two terminals 61b–61c are connected to opposite ends of the resistance element of potentiometer 54.

It can be readily appreciated that by applying a suitable voltage across the resistance element of the potentiometer 54, the voltage on the movable contact arm thereof would be directly proportional to the angle α of the boom 22 with respect to the horizontal line 32.

In order to simulate the curve 51 illustrated in FIG. 3, voltages corresponding to the ordinates of points 62b–62m on the curve 52 can be applied to successive and corresponding taps 60b–60m of the resistance element of potentiometer 53 and a voltage proportional to the load will be realized on the movable contact arm of the potentiometer 53. Since the movable contact arm of the potentiometer 53 is positioned in accordance with the boom angle α, the voltage obtained on the movable contact arm will be proportional to the safe load on the axis of ordinates of the graph illustrated in FIG. 3. That is, by applying voltages to the taps of the potentiometer 53 equal to the ordinates of the points 62b–62m of the graph illustrated in FIG. 3, rotation of the movable contact arm of the potentiometer 53 from one end of the resistance element to the other end thereof would produce a relationship depicted by the curve 52 illustrated in FIG. 3. The boom angle on the axis of abscissas would be represented by the position of the movable contact arm and the safe load on the axis of ordinates would be represented by the voltage developed on the movable contact arm. The respective points 62b–62m would be represented by the voltages applied to the respective terminals 60b–60m which are connected to respective taps on the resistance element of the potentiometer 53. It can be readily appreciated, therefore, that the device of the present invention provides a relatively simple structure for simulating a safe load curve for operation of a crane under safe loading conditions.

Figures 5, 7, 8:
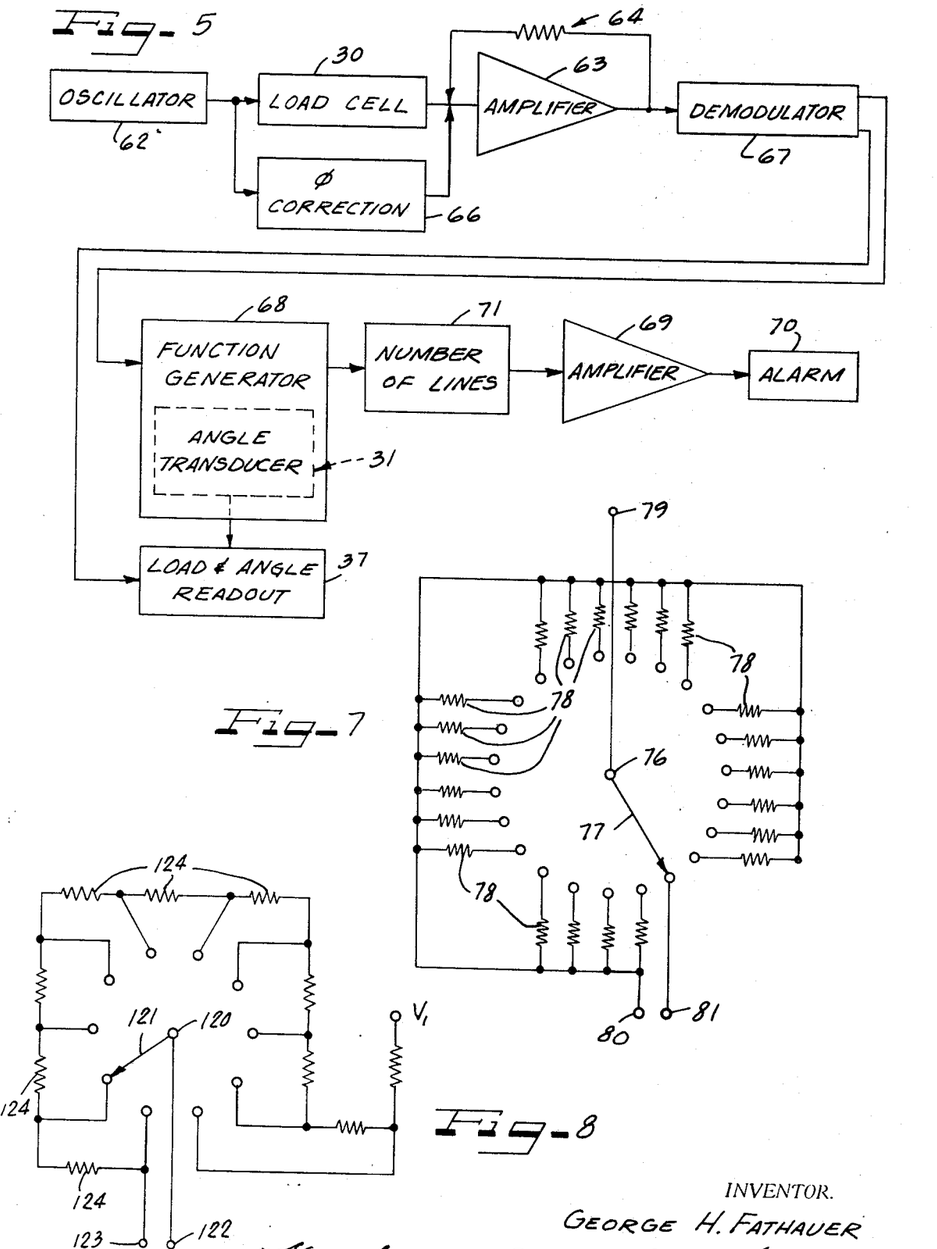
FIG. 5 is a simplified block diagram of the computer or load warning device constructed in accordance with the principles of the present invention.
FIG. 7 is a schematic illustration of the input circuit to the operational amplifiers illustrated in FIG. 6.
FIG. 8 is a schematic diagram of the feedback circuit of an operational amplifier illustrated in FIG. 6.

FIG. 5 illustrates a system for producing the voltages to be applied to the taps 60b–60m on the potentiometer 53 and for producing an alarm when the load being supported on the crane is greater than the recommended safe load. In particular, the load cell 30 is supplied with an alternating current voltage from an oscillator 62 and provides an output indicative of the load being supported on the crane to an amplifier 63. The load cell 30 is preferably a differential transformer which includes a primary winding connected to an output of the oscillator 62, a pair of secondary windings connected in phase opposition to one another, and a movable slug disposed for supporting a weight thereon which is to be measured and for changing the coupling between the primary winding and the secondary windings. At no load conditions, the coupling to the secondary windings is preferably equal. When the slug is moved under the influence of a weight thereon, the coupling from the primary winding to one of the secondary windings is reduced and the coupling to the other secondary winding is increased. As a result of this change in the coupling, a signal is provided at an output of the load cell 30, the amplitude of which is proportional to the weight supported on the slug. The differential transformer load cell is well known in the art. It is to be understood, however, that other types of load cells may also be employed in the practice of the present invention. The amplifier 63 is provided with a feedback resistance 64 and phase correction for the load cell 30 is provided by a circuit 66. The output of the amplifier 63 is supplied to a demodulator 67 wherein the signal is rectified.

One output of the demodulator 67 is supplied to the readout 37 for providing an indication of the load being supported on the load cell 30. Another output of the demodulator 67 is supplied to a function generator 68 wherein the voltages which are to be supplied to the angle transducer 31 are produced. The angle transducer 31 supples a signal to the readout 37 for providing an indication of the angle α of the boom 22. An output of the function generator 68 is supplied through an amplifier 69 to an alarm 70 which indicates an unsafe loading condition for a particular load being supported and for a particular angle of the boom with respect to a horizontal line.

It will be noted from FIG. 1 that the load cell 30 is mounted at a point in the load supporting structures of the crane to receive the entire weight of the load thereon. It may be desirable, however, to position the load cell 30 at a point in the load supporting structures so that only a fractional portion of the weight of the load is realized thereby. For instance, the load cell 30 can be connected in the cable 24, such as by cutting the cable 24 and securing the cut ends to opposite sides of the load cell 30. In such an instance, however, the output of the load cell would be equal to the load supported on the crane 28 multiplied by the number of lines in the tackle assembly 23. Since it is possible for the tackle assembly to be changed by providing a greater or a lesser number of lines therein, a circuit 71 is provided between the function generator 68 and the amplifier 69 for providing such a multiplication. It is to be understood that the load cell 30 can also be positioned to sense the tension in the cable 24, if desired, or any suitable installation can be provided which will provide an output indicative of the load being supported by the crane.

Figure 6:
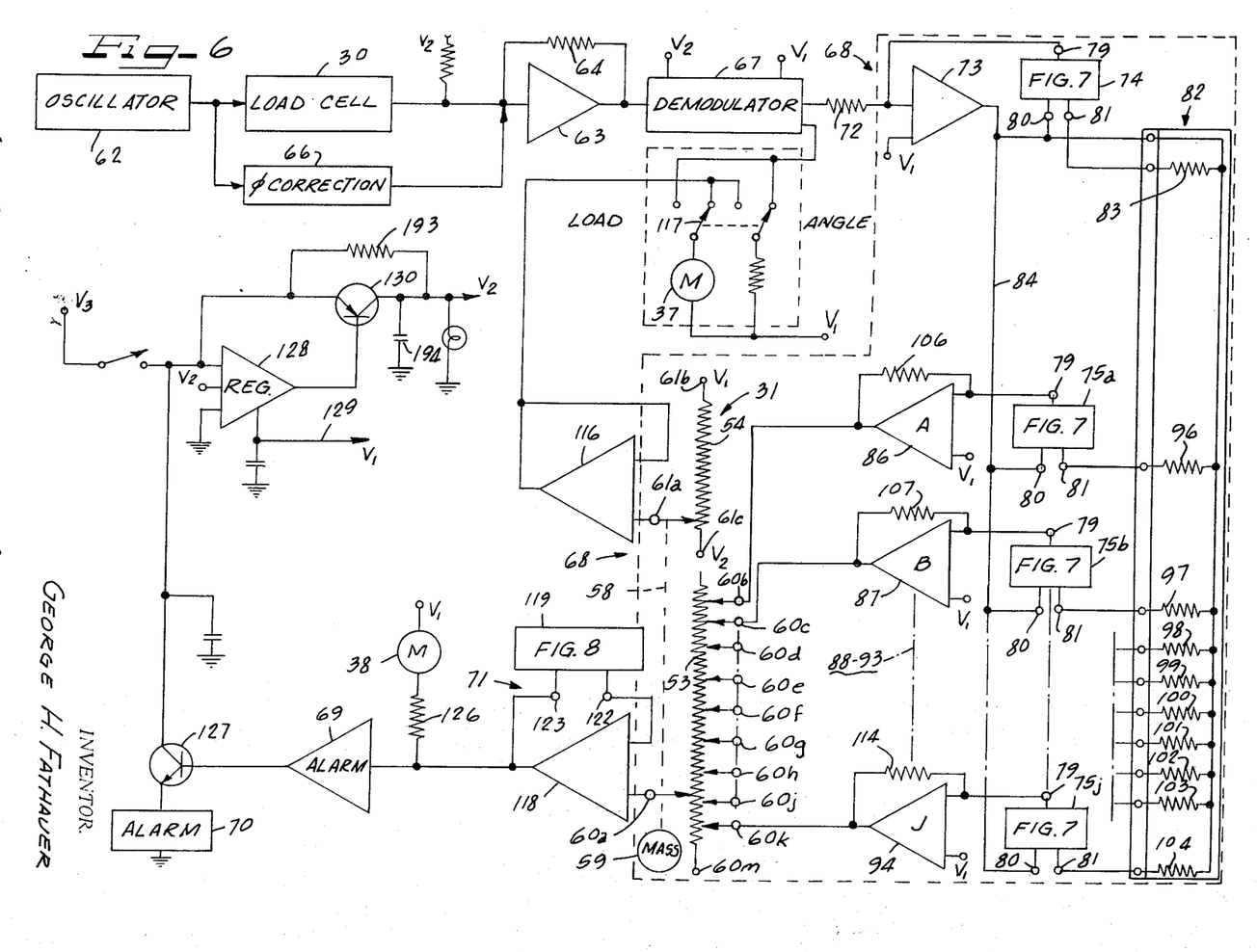
FIG. 6 is a more detailed block diagram of the system illustrated in FIG. 5.

The block diagram of FIG. 5 is illustrated in more detail in FIG. 6. As shown therein, the function generator 68 is connected to an output of the demodulator 67 through a resistor 72. The input of the function generator 68 is connected to one input of an operational amplifier 73. A feedback circuit 74 is connected between an output of the amplifier 73 and an input thereof. The feedback circuit 74 is illustrated in FIG. 7 and generally includes a selector switch 76 having a movable contact arm 77 which is disposed for connecting one of a plurality of resistors 78 between a terminal 79 and a terminal 80. In addition, the movable contact arm 77 is disposed for connecting the terminal 79 directly to a terminal 81. The terminal 79 of the feedback circuit 74 is connected to an input of the amplifier 73 and the terminal 80 is connected to an output thereof.

In essence, the selector switch 76 selects one of the resistors 78 to be connected between the output and the input of the amplifier 73. Therefore, the selector switch 76 performs the function of a multiplier.

A program card, generally designated with the reference numeral 82, is disposed for being received in the slot 44 in the front panel 41 of the control unit 33 and includes a resistor 83 thereon. When the program card 82 is inserted into the slot 44, the resistor 83 is connected between the terminal 80 and the terminal 81 of the selector switch 76. Therefore, when the movable contact 77 of the selector switch 76 is in the position illustrated in the drawing, the resistor 83 forms the feedback circuit for the amplifier 73. It can be readily appreciated that the program of the device of the present invention can be altered either by the selector switch 76 or by insertion of the program card 82 into the slot 44 of the control unit 33.

The operational amplifier 73 provides an output on a line 84 which is supplied to an input of a plurality of operational amplifiers 86–94 through a respective selector switch 75a–75j. The operational amplifiers 88–93 are omitted from the drawing for simplicity of illustration and are represented by the dot-dash line designated 88–93. The selector switches 75a–75j are connected between the output of the operational amplifiers 73 on the line 84 and one input of the operational amplifiers 86–94 and are disposed for connecting a predetermined value of resistance therebetween. In addition, the program card includes a plurality of resistors 96–104 which may be connected by the selector switches 75a–75j between an output of the operational amplifier 73 and a respective input of the operational amplifiers 86–94. The dot-dash lines in the drawing indicate the omission of parts from the drawing for purposes of simplicity of illustration. Each of the operational amplifiers 86–94 are provided with a feedback resistance 106–114.

Outputs of the amplifiers 86–94 are connected to the terminals 60b–60k of the potentiometer 53. As previously discussed, an output of each of the amplifiers 86–94 corresponds to the ordinate of a corresponding point 62b–62m on the curve 52 illustrated in FIG. 3. The voltage outputs of the amplifiers 86–94 can be varied individually by changing the input resistance to each of the amplifiers. As previously mentioned, the input resistance to each of the amplifiers 86–94 is selected by operation of the selector switches 75a–75j. The outputs of all of the amplifiers 86–94 can be changed collectively by the selector switch 74 connected in the feedback circuit of the amplifier 73. Each of the switches 74 and 75a–75j are ganged together so as to provide continuously increasing voltage steps on the potentiometer 53. In this manner, voltage increments are produced which will simulate various curves, such as the curve 52 illustrated in FIG. 3. By positioning the switches 74 and 75a–75j such that electrical contact is effected between the terminals 79 and 81, the resistor 83 of the program card 82 will be connected into the feedback path of the amplifier 73 and the resistors 96–104 of the program card 82 will be connected as input resistors to the amplifiers 86–94 respectively. Therefore, if the desired program cannot be established by proper selection of the switches 74 and 75a–75j, an appropriate program card 82 can be fabricated having the desired resistance values for the resistors 83 and 96–104.

The lever 58 illustrated in FIG. 4 which is secured to the shaft 57 of the potentiometers 53 and 54 is illustrated diagrammatically in FIG. 6 by the dashed line designated with the numeral 58. The movable contact arms of the potentiometers 53 and 54 are positioned in accordance with the angle of the boom with respect to a horizontal line. The terminals 61b and 61c of the potentiometer 54 are connected to suitable voltages $V_1$ and $V_2$ respectively. The voltage realized on the movable contact arm of the potentiometer 54, therefore, is proportional to the angle of the boom with respect to a horizontal line. The movable contact arm of the potentiometer 54 is connected to an input of an amplifier 116.

An output of the operational amplifier 116 is connected to the meter 37 through a switch 117 to provide a readout of the angle of the boom with respect to a horizontal line thereon. An output of the demodulator 67 is also connected through the switch 117 to the meter 37 to provide a readout of the load being supported on the crane. Therefore, when the switch 117 is in the position as illustrated in the drawing, a readout of the angle of the boom with respect to a horizontal line is provided and when the switch 117 is in the opposite position to that illustrated in the drawing, a readout of the load being supported by the crane is indicated on the meter 37.

The movable contact arm of the potentiometer 53 is connected to one input of an amplifier 118 having a feedback circuit generally designated with the reference numeral 119.

The feedback circuit 119 is illustrated in FIG. 8 and includes a selector switch 120 having a movable contact arm 121. The movable contact arm 121 is connected to a terminal 122 which is, in turn, connected to an input of the amplifier 118. A terminal 123 is connected to the fixed contacts of the selector switch 120 to a series of resistors 124. The terminal 123 is connected to an output of the amplifier 118. By changing the position of the movable contact arm 121 of the selector switch 120, the resistance of the feedback circuit for the amplifier 118 is altered. This change in the feedback resistance effects a multiplication of the output of the amplifier 118. This multiplication factor is related to the "parts of line" in the tackle assembly 23.

As previously mentioned, the voltage developed on the movable contact arm of the potentiometer 53 is proportional to the capacity of the crane with respect to the load being lifted. The output of the amplifier 118 is connected through a resistor 126 to the meter 38 to provide a readout of the crane capacity in percent. The output of the amplifier 118 is also connected through the alarm amplifier 69 to the base of a transistor 127. The transistor 127 is connected between a source of unregulated voltage $V_3$ and the alarm device 70. Consequently, if the voltage realized by the movable contact arm of the potentiometer 53 exceeds a predetermined limit, an alarm will be provided by the device 70.

The voltage $V_3$ is connected to an input of a voltage regulator 128 which develops a regulated voltage $V_1$ on an output line 129. Another output of the voltage regulator 128 is connected to the base of a transistor 130. The emitter of the transistor 130 is connected to the voltage $V_3$ and a regulated output voltage $V_2$ is developed at the collector thereof.

Figure 9:
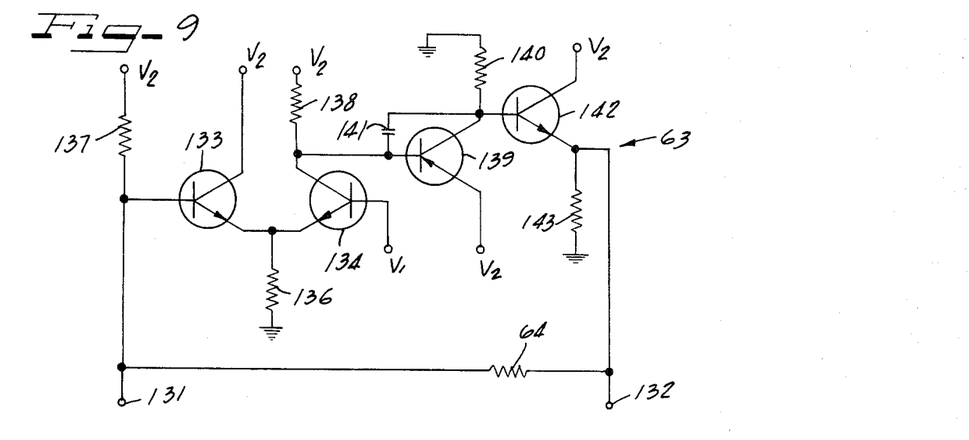
FIGS. 9–13 are schematic diagrams of the operational amplifiers employed in the system illustrated in FIG. 6.

FIG. 9 illustrates a schematic diagram of the operational amplifier 63. A terminal 131 forms an input to the amplifier and a terminal 132 forms an output thereof. The feedback resistor 64 is connected between the terminals 131 and 132 and forms a feedback circuit for the amplifier.

The operational amplifier 63 includes a pair of transistors 133 and 134 having their emitters connected together through a resistance 136 to ground potential. The input terminal 131 is connected to the base of the transistor 133 and the voltage source $V_2$ is connected to the base of the transistor 133 through a resistor 137. The collector of the transistor 133 is connected to the voltage source $V_2$. Any variation in the input signal on the terminal 131 will alter the conduction of the transistor 133 to change the potential applied to the emitter of the transistor 134. The base of the transistor 134 is connected to the voltage source $V_1$ and, therefore, the transistor 134 is biased by the voltage at the emitter thereof. The collector of the transistor 134 is connected through a resistance 138 to the voltage $V_2$ and to the base of a transistor 139. The signal which is amplified by the transistor 134 is applied to the base of the transistor 139 for further amplification thereof.

The emitter of the transistor 139 is connected to the voltage $V_2$ and the emitter thereof is connected through a resistance 140 to ground potential and a capacitor 141 to the base thereof. The amplified signal at the collector of the transistor 139 is supplied to the base of a transistor 142 having the collector thereof connected to the voltage $V_2$. The emitter of the transistor 142 is connected to the output terminal 132 and through a resistance 143 to ground potential. This arrangement provides a relatively large amplification factor. The signal developed at the output terminal 132 is fed back through the resistor 64 to the input terminal 131. If an input signal is supplied to the terminal 131, the output will attain a value which will provide through the resistor 64 a nullification of the input signal at the base of the transistor 133. Any increase in the input signal, therefore, will cause the output from the amplifier 63 to increase.

Figure 10:
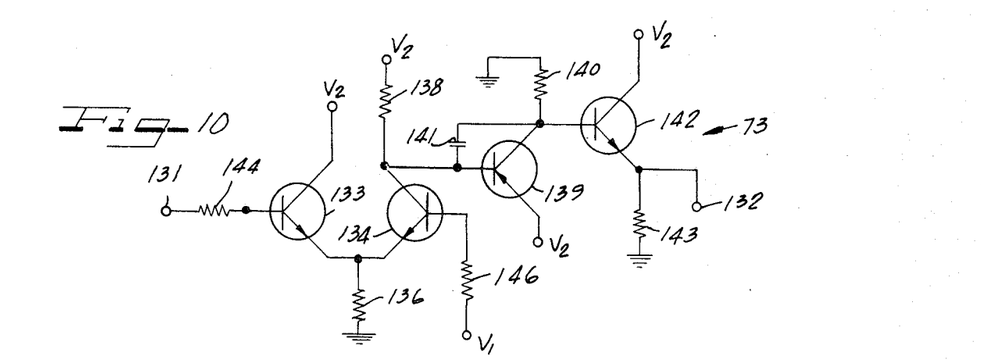

FIG. 10 illustrates a schematic diagram of the operational amplifier 73. Since the amplifier 73 is substantially identical to the amplifier 63 illustrated in FIG. 9, the correspondingly similar components have been designated with the same reference numeral. In the amplifier 73, the base of the transistor 133 is connected solely through a resistor 144 to the input terminal 131. In addition, the base of the transistor 134 is connected through a resistor 146 to the voltage source $V_1$. The feedback circuit for the amplifier 73 is formed of the resistance network and switch illustrated in FIG. 7 or the resistor 83 on the program card 82. This feedback arrangement is illustrated in FIG. 6 of the drawings.

Figure 11:
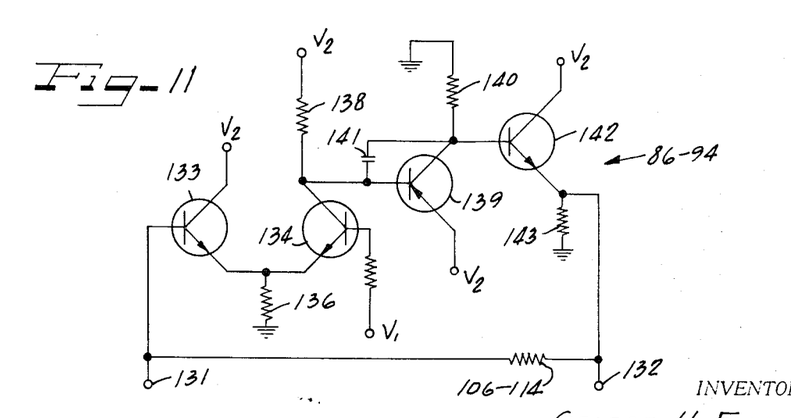

FIG. 11 illustrates a schematic diagram of the operational amplifiers 86–94. Each of the operational amplifiers 86–94 are also similiar to the amplifier 63 illustrated in FIG. 9 and, consequently, the correspondingly similar components thereof have been designated with the same reference numeral. The output terminal 132 of the amplifier 73 illustrated in FIG. 10 is connected to a respective one of the input terminals 131 of the amplifiers 86–94 illustrated in FIG. 11 through the resistance network and switch of FIG. 7 or through a respective one of the resistances 96–104 on the program card 82.

Figures 12, 13, 14, 15:
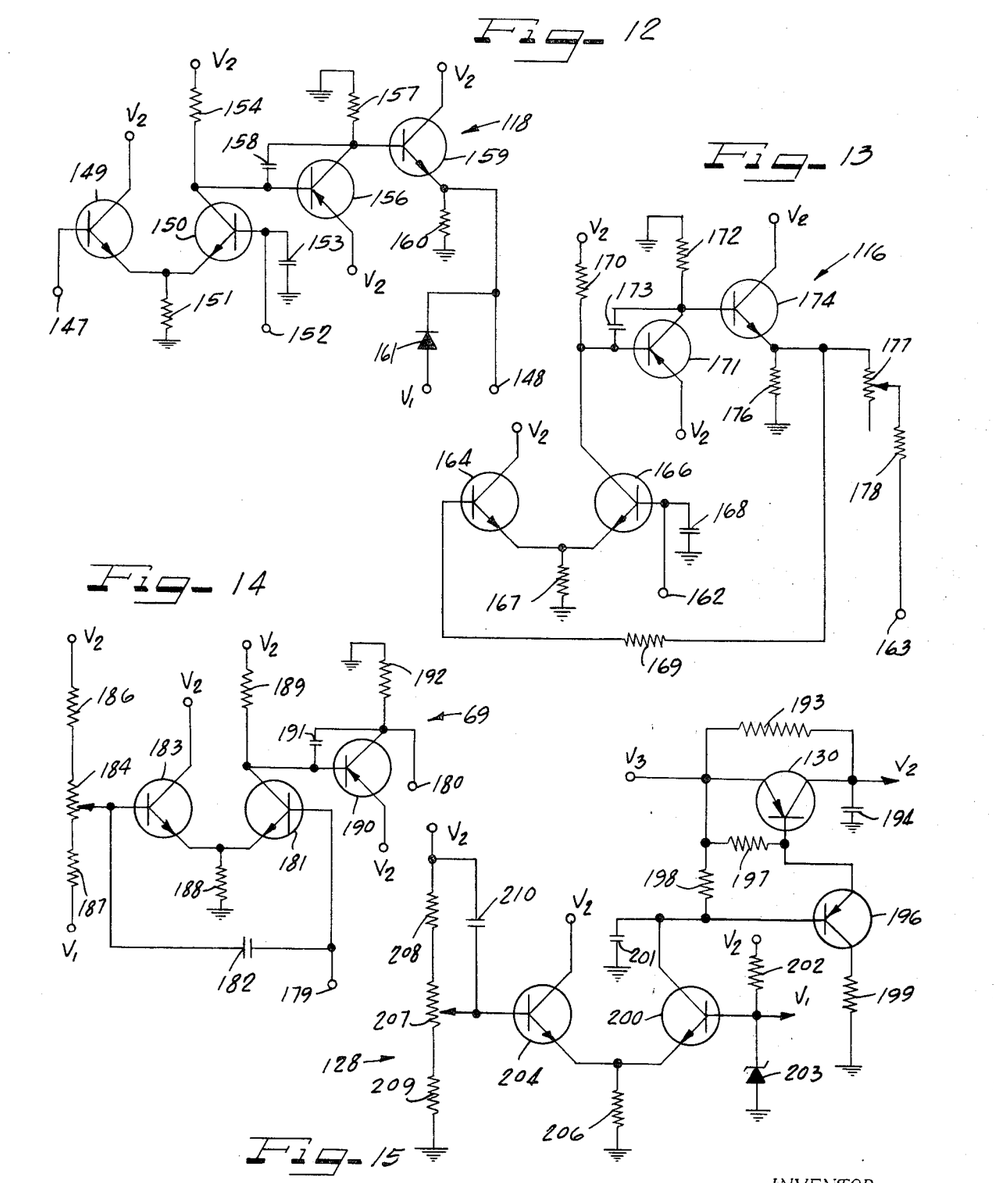
FIG. 14 is a schematic diagram of the alarm amplifier employed in the system illustrated in FIG. 6.
FIG. 15 is a schematic diagram of the voltage regulator control employed in the system illustrated in FIG. 6.

FIG. 12 illustrates a schematic diagram of the operational amplifier 118. A terminal 147 forms a feedback input to the amplifier and a terminal 148 forms an output thereof. The feedback circuit illustrated in FIG. 8 is connected between the terminals 147 and 148. The terminal 147 is connected to the base of a transistor 149 having the collector thereof connected to the voltage $V_2$. The emitter of the transistor 149 is connected in common with the emitter of a transistor 150 and through a resistor 151 to ground potential. A terminal 152 forms a signal input to the amplifier 118 and is connected to the base of the transistor 150 and through a capacitor 153 to ground potential. The collector of the transistor 150 is connected to the voltage $V_2$ through a resistor 154.

The conduction level of the transistor 149 is dependent upon the signal which is supplied from the output terminal 148 and through the feedback circuit illustrated in FIG. 8 to the base thereof. The conduction level of the transistor 149 determines the potential at the emitter of the transistor 150, which transistor is disposed for amplifying the input signal applied to the base thereof. Consequently, as the potential at the emitter of the transistor 150 is varied, the amplification of the signal at the input terminal 152 will also vary. The feedback circuit for the amplifier 118 is employed for changing the amplification factor of the amplifier in accordance with the number of lines in the tackle assembly 23 of the crane.

The amplified signal at the collector of the transistor 150 is supplied to the base of a transistor 156. The emitter of the transistor 156 is connected to the voltage $V_2$ and the collector thereof is connected through a resistor 157 to ground potential and through a capacitor 158 to the base. The amplified signal at the collector of the transistor 156 is supplied to the base of a transistor 159. The collector of the transistor 159 is connected to the voltage $V_2$ and the emitter thereof is connected to the output terminal 148 and through a resistor 160 to ground potential. The voltage $V_1$ is connected through a diode 161 to the output terminal 148. If the voltage $V_1$ is positive, the cathode of the diode 161 is connected to the output terminal 148.

FIG. 13 illustrates a schematic diagram of the operational amplifier 116. A terminal 162 forms an input to the amplifier and a terminal 163 forms an output thereof. The collector of the transistor 164 is connected to the voltage $V_2$ and the emitter thereof is connected in common to the emitter of a transistor 166 and through a resistor 167 to ground potential. The input terminal 162 is connected to the base of the transistor 166 and through a capacitor 168 to ground potential. A feedback resistor 169 is connected between an output of the amplifier 116 and the base of the transistor 164. The feedback signal through the resistor 169 determines the conduction level of the transistor 164 and the potential developed at the emitter of the transistor 166. Consequently, amplification of an input signal on the input terminal 162 by the transistor 166 will be dependent upon the feedback signal through the feedback resistor 169. The collector of the transistor 166 is connected through a resistor 170 to the voltage $V_2$ and also to the base of a transistor 171. The emitter of the transistor 171 is connected to the voltage $V_2$. The collector of the transistor 171 is connected through a resistor 172 to ground potential and through a capacitor 173 to the base thereof. The signal which is amplified by the transistor 171 is supplied to the base of a transistor 174. The collector of the transistor 174 is connected to the voltage $V_2$ and the emitter thereof is connected through a resistor 176 to ground potential. The emitter of the transistor 174 is connected through a calibration resistance 177 and a resistor 178 to the output terminal 163. The feedback resistor 169 is connected between the emitter of the transistor 174 and the base of the transistor 164.

FIG. 14 illustrates a schematic diagram of the alarm amplifier 69. A terminal 179 forms an input to the amplifier and a terminal 180 forms an output thereof. The input terminal 179 is connected to the base of a transistor 181 and through a capacitor 182 to the base of a transistor 183. The base of the transistor 183 is connected to the variable contact arm of a potentiometer 184 which is connected in series with a pair of resistors 186 and 187 between the voltages $V_2$ and $V_1$. The collector of the transistor 183 is connected to the voltage $V_2$ and the emitter thereof is connected in common with the emitter of the transistor 181 and through a resistor 188 to ground potential.

The conduction level of the transistor 183 is determined by the position of the contact arm of the potentiometer 184 and determines the potential developed at the emitter of the transistor 181. An input signal applied to the input terminal 179 is amplified by the transistor 181 at the collector thereof, which amplification is dependent upon the potential at the emitter of the transistor 181. The collector of the transistor 181 is connected through a resistor 189 to the voltage $V_2$ and to the base of a transistor 190. The emitter of the transistor 190 is connected to the voltage $V_2$ and the collector thereof is connected through a capacitor 191 to the base thereof and through a resistor 192 to ground potential. The collector of the transistor 190 forms an output of the amplifier 69.

FIG. 15 illustrates a schematic diagram of the voltage regulator 128 which develops the regulated voltages $V_2$ and $V_1$ from an unregulated voltage supply $V_3$. The voltage $V_3$ is connected to the emitter of the transistor 130 and the voltage $V_2$ is developed at the collector thereof. The conduction level of the transistor 130 determines the value of the voltage $V_2$, which conduction level is established by the voltage applied to the base of the transistor 130. The collector of the transistor 130 is connected to the emitter through a resistor 193 and is further connected to ground potential through a capacitor 194. The voltage $V_3$ is connected to the base of the transistor 130 and to the emitter of a transistor 196 through a resistor 197. The voltage $V_3$ is also connected to the base of the transistor 196 through a resistor 198. The collector of the transistor 196 is connected through a resistor 199 to ground potential. The potential developed at the base of the transistor 130 is dependent upon the conduction level of the transistor 196, which is in turn, dependent upon the conduction level of a transistor 200. The collector of the transistor 200 is connected to the base of the transistor 196 and also through a capacitor 201 to ground potential. The base of the transistor 200 is connected to the voltage $V_1$ which is developed across a network including a resistor 202 and a Zener diode 203 connected in series between the voltage $V_2$ and ground potential. The conduction level of the transistor 200 is determined by the potential applied to the emitter thereof which is connected in common with the emitter of a transistor 204 and is also connected through a resistor 206 to ground potential. The collector of the transistor 204 is connected to the voltage $V_2$ and the base thereof is connected to the movable contact arm of a potentiometer 207 which is connected in series with a pair of resistors 208 and 209 between the voltage $V_2$ and ground potential. The base of the transistor 204 is also connected through a capacitor 210 to the voltage $V_2$. The conduction level of the transistor 204, which determines the potential developed at the emitter of the transistor 200, is determined by the position of the movable contact arm of the potentiometer 207. Therefore, the voltage $V_2$ can be adjusted by adjustment of the movable contact arm of the potentiometer 207. The voltage $V_1$ is fixed, since it is equal to the Zener breakdown voltage of the Zener diode 203.

The principles of the invention explained in connection with the specific exemplifications thereof will suggest many other applications and modifications of the same.

The invention claimed is:

1. A loading indicator circuit for a crane and the like having a boom supporting a load, comprising load sensing means for sensing the weight of the load, angle sensing means for sensing the angle of the boom with respect to a horizontal line, developing means responsive to said weight sensing means and to said angle sensing means for developing an indication of a predetermined relationship between the weight of the load and the angle of the boom, an indicator connected to said developing means, said developing means including a potentiometer means for developing a plurality of voltages of successively increasing voltage values, means for supplying said plurality of voltages to successive points on said potentiometer to produce a plurality of voltage gradients thereacross, and means for changing the value of the voltage gradients on said potentiometer.

2. A loading indicator circuit as defined in claim 1, wherein said potentiometer includes a variable contact, and said angle sensing means includes means for moving said contact to a point on said potentiometer spaced a distance from one end thereof which is proportional to the angle of the boom with respect to a horizontal line.

3. A loading indicator circuit for a crane and the like having a boom for supporting a load, comprising load sensing means for sensing the weight of the load, angle sensing means for sensing the angle of the boom with respect to a horizontal line, developing means responsive to said weight sensing means and to said angle sensing means for developing an indication of a predetermined relationship between the weight of the load and the angle of the boom, an indicator connected to said developing means, said developing means including a plurality of first amplifiers each having having an input circuit connected to an output of said load sensing means, each of said input circuits including an impedance element, each impedance element having a different value than the other impedance elements, a potentiometer including a resistance element, an output of each of said first amplifiers connected to respective points on said resistance element, said potentiometer including a variable contact responsive to said angle sensing means, and means for moving said contact to a point on said resistance element spaced a distance from one end thereof which is proportional to the angle of the boom with respect to a horizontal line.

4. A loading indicator device for a crane and the like having a boom for supporting a load, comprising
 (a) means for sensing the weight of the load,
 (b) a plurality of first amplifiers connected to an output of said weight sensing means,
 (c) a potentiometer mounted on the boom and having a first resistance element with a plurality of taps each connected to an output of a respective one of said amplifiers, said potentiometer including a first variable contact arm and means for moving said first contact arm a distance along said first resistance element proportional to the angle of the boom with respect to a horizontal line, and
 (d) a first indicator connected to said first contact arm.

5. A loading indicator device as defined in claim 4, wherein said potentiometer includes a second resistance element and a second contact arm engageable therewith, said moving means including means for moving said second contact arm a distance along said second resistance element proportional to the angle of the boom with respect to a horizontal line, and a second indicator connected to said second contact arm.

6. A loading indicator circuit as defined in claim 5, further comprising means for selectively connecting said second contact arm and an output of said weight sensing means to said second indicator.

7. A loading indicator device as defined in claim 4, further comprising means for varying the amplification factor of each of said first amplifiers.

8. A loading indicator device as defined in claim 4, further comprising a second amplifier connected between an output of said weight sensing means and an input of each of said first amplifiers.

9. A loading indicator device as indicated in claim 8 further comprising means for varying the amplification factors of each of said first amplifiers and of said second amplifier.

10. A loading indicator device for a crane and the like load, comprising a load cell connected to said tackle assembly and disposed for receiving at least a portion of the weight of the load thereon, a first amplifier connected to the output of said load cell, a plurality of second amplifiers each having a different amplification factor connected to an output of said first amplifier, a potentiometer having a first resistance element formed with a plurality of taps which are respectively connected to the outputs of said plurality of second amplifiers and a first rotatable contact arm engageable therewith, said first resistance element being mounted on the boom and said first contact arm extending substantially horizontally therefrom, a lever arm secured to said first contact arm and extending vertically therefrom, a mask secured to an end of said lever arm, and a first indicator connected to said first contact arm.

11. A loading indicator device as defined in claim 10, further comprising means for varying the amplification factor of said first amplifier and of each of said second amplifiers.

12. A loading indicator device as defined in claim 11, wherein said varying means includes first variable resistance means connected in a feedback path of said first amplifier and a plurality of second variable resistance means each connected between an output of said first amplifier and an input of a respective one of said second amplifiers.

13. A loading indicator device as defined in claim 10, further comprising an oscillator connected to an input of said load cell, and a demodulator connected between an output of said load cell and an input of said first amplifier.

14. A loading indicator device as defined in claim 10, wherein said potentiometer includes a second resistance element mounted on the boom, and a second rotatable contact arm engageable therewith, said second contact arm being mechanically connected in tandem with said first contact arm, and a second indicator connected to said second contact arm.

References Cited
UNITED STATES PATENTS
3,371,224  2/1968  Polo ______________ 328—143

ALVIN H. WARING, Primary Examiner

P. PALAN, Assistant Examiner

U.S. Cl. X.R.

340—282; 212—2, 39; 328—143; 330—124